Patented Sept. 9, 1924.

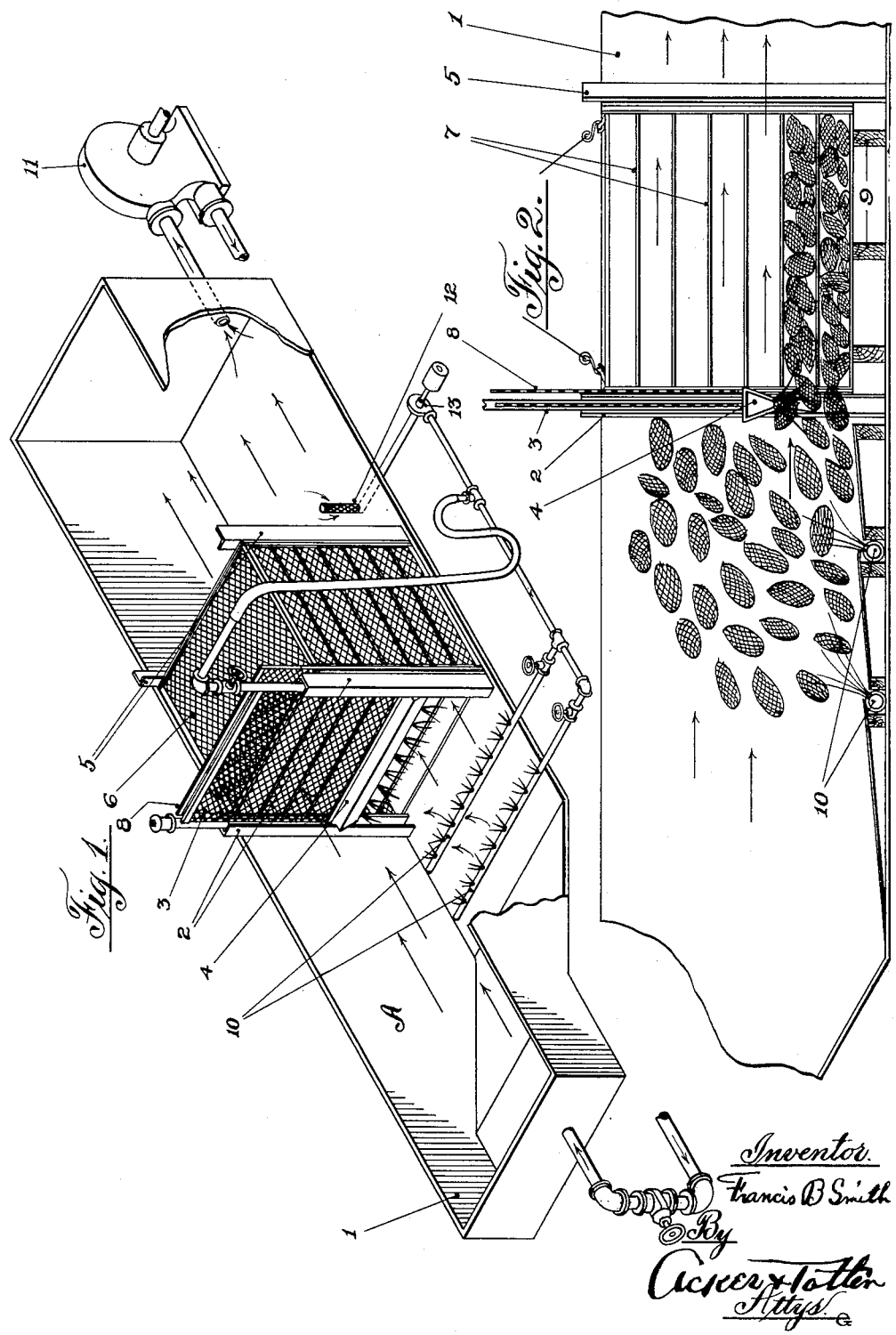

1,507,864

UNITED STATES PATENT OFFICE.

FRANCIS BETTS SMITH, OF SAN FRANCISCO, CALIFORNIA.

METHOD OF LOADING.

Application filed October 22, 1923. Serial No. 670,101.

*To all whom it may concern:*

Be it known that I, FRANCIS BETTS SMITH, a citizen of the United States, residing at city and county of San Francisco and State of California, have invented certain new and useful Improvements in Methods of Loading, of which the following is a specification.

This invention relates to a method of accumulating and handling diverse articles of commerce and is particularly adapted to the gathering, accumulating and handling of fruit such as pineapples, oranges, limes and any other fruit or products of the soil that would be amenable to handling in the manner to be described.

In a description of my improved method I will confine my explanation of its operation and application to that of handling pineapples, with the understanding, however, that the explanation thus given will apply as well to any other article or product of the soil.

In the ordinary present day methods of gathering and handling pineapples a system is in vogue that requires the handling and rehandling of vast numbers of small easily portable boxes, technically known as "lug boxes." These small boxes are of a size to accommodate about two layers of the fruit, on account of its size and weight more layers would be likely to cause crushing damage to the tender surfaced ripe fruit. These boxes must also be of such a size that they are easily lifted and handled when filled.

These conditions prohibit large units for handling and conveyance. The present practice, therefore, consists in substantially the following routine.

The small boxes are distributed about a plantation and are filled with freshly gathered pineapples. They are then transported by any suitable means to the location of a train of cars, where they are piled and stacked for transportation to the canning factory, storage or packing house, which may be located anywhere from a mile to several miles away from the growing crops.

Here the boxes are individually handled again, the fruit deposited where needed, and the empty boxes returned to the cars to be taken back to the field for refilling. This process is repeated ad libitum until the entire crop is harvested.

The individual handling of so many small units requires quite a large force of employees for this one duty and adds considerable expense to the gathering of a crop.

A principal object of my improved method of gathering a crop of pineapples contemplates the complete elimination of the lug box, or at least a partial elimination.

I propose placing at a central accumulating station, suitably located as regards the extent of the plantation, a large tank provided with a circulating fluid medium.

In this tank I propose placing a perforate gate or barrier, dividing the tank into two zones. On one side of this barrier I propose placing a large perforate container, having perforate gates on opposite sides, or on only one side. I propose providing a fluid circulating apparatus that will circulate a fluid in said tank in a direction to first pass through the perforate or screened barrier in the tank and then through the perforate or screened container.

The pineapples as gathered in the field may be placed in the lug boxes as before, or they may be placed directly into suitable carts and thus transported to the location of the central accumulating station. Here they are dumped promiscuously into the forward end of the tank. The rapid circulation of the fluid medium, and its further agitation, by means to be described, will cause the fruit to be held in mobile suspension and to move against the screened barrier in the tank.

The perforate container will have shelves or trays spaced in vertical superposed arrangement and having space between each tray to accommodate about two layers of the fruit.

Proper means will be provided to gradually raise the tank gate or barrier and simultaneously raise the gate in the side of the container next to the barrier gate and thereby uncover the opening into the lowermost tray compartment of the container. The pineapples being pushed against the barrier gate by the force of the circulating fluid medium, will immediately move into the lower tray compartment of the container as soon as the two gates are raised sufficiently for them to enter.

Pineapples are not completely buoyant and would lie compacted in the fluid medium unless the medium was agitated, when agitated, however, they become mobile with the medium and will follow its flow, therefore as soon as the openings into the several tray compartments are uncovered the apples will move into the spaces between the trays and become compacted therein.

When all of the trays are filled, in a container, the gates are lowered shutting them into the container and pushing the crowding apples away from the openings into the compartments, when the gates are completely closed the filled container will be hoisted by suitable mechanism and loaded in toto onto a waiting car. As soon as one container is filled and removed from the loading tank an empty container takes its place and the operation just described is repeated and continued until a train load is ready for transport.

Instead of loading directly from the tank onto a waiting car the filled containers may be temporarily placed on a storage platform and there accumulated in sufficient number to provide a train load as often as the train could make the trip to its destination and return.

Instead of using a train on plantations where the haul is short, a simple telpherage system might be employed wherein the loaded containers would be transferred directly to the telpherage conveyor and immediately start on the trip to the cannery or other destination. The telpherage may consist of either a cable or monorail either of which are in daily use in the various industries and are well known.

When the filled containers reach their destination they would be placed in a tank of circulating medium in such a manner that the flow of the medium would be first through the container. There would be no particular need of a barrier gate in this tank, as the lifting of the container gate would permit egress of the fruit as the flow of the medium carried it out of the tray compartments. This tank would have an open end leading into a fluid runway extending in any desirable direction through the cannery, through which runway the individual fruits would be transported and handled in any manner desirable.

As soon as one of the containers was emptied it would be removed from the tank and started back to the field for another filling.

These large containers being handled by suitable power means could be of any convenient and desirable size and have a capacity equal to many of the small lug boxes.

This method of handling and transporting articles will very materially increase the gathering capacity of an organization and very greatly reduce the expense attendant therewith and will have a very material tendency to eliminate spoilage from damaged and bruised fruit due, now, to the great amount of handling it is subjected to when using the small lug boxes.

In carrying out the objects of my improved method further advantages and objects have been evolved than have been mentioned and in order to make the method more clearly understood I have diagrammatically shown in the accompanying drawings one way of embodying the creative part or conception of the invention in a concrete form of apparatus.

Other structures might employ my method or some parts or combinations of the same without a departure from the purview of my invention and I regard myself as entitled to such variations and changes as fall within the scope and meaning of the claims hereto appended.

Reference now being had to the drawings accompanying this specification in which like figures of reference indicate like parts in the several views.

Figure 1 is an isometric projection diagrammatically showing my method as applied to an apparatus for the handling of pineapples. In this view I have omitted all power means for operating the various parts of the apparatus as such means are of ordinary commercial design and construction and form no part of this invention except where they enter into combination therewith, in which case they will be referred to without further description. The placement of the various parts and elements are for illustration only and do not necessarily show or indicate proper engineering practice.

Figure 2 is a side sectional elevation looking from the front side of Fig. 1 and showing in more detail the main operating elements required to practice my method. This view also shows in more detail a form of structure desirable for the operation of the method.

The numeral 1 indicates in general a tank of liquid tight construction. Centrally disposed therein are guide members 2 of channel formation in which is mounted for vertical reciprocation a perforate gate or barrier 3. This gate is made up of a suitable wire screen material to give free access and circulation of the fluid medium. The lower edge of this gate 3 carries a fluid spray member 4 having holes in its lower edge through which portions of the fluid contents of the tank are forcibly ejected. Spaced away from the guide members 2 are other guide members 5. Removably located between said guide members is a container cage 6 made up of a wire screen material to give free access and circulation of the fluid medium. The container 6 is provided with spaced trays or shelves 7 arranged in vertical superposed relation. The container 6 is also provided with gates of screen material as at 8, or it may have only one gate.

The container may conveniently rest on cross members 9 thus elevating it above the bottom of the tank, which provides a space for the accumulation of dirt and residue washed from the fruit. An opening may be placed in the bottom of the tank for the removal of such residue at frequent intervals.

The fluid spray member 4 has a wide upper surface one edge of which extends inward toward the container 6 and is adapted to engage the under edge of the container gate 8 and lift it in unison with the opening of the gate 3, thus opening the tray compartments uniformly when the gates are moved upward.

In the forward bottom of the tank 1 and in front of the gate or barrier 3 is arranged a false floor having lateral openings in which are disposed spray pipes 10 which serve to project sprays of liquid with considerable force, up into the body of fruit suspended in the liquid. These sprays add considerably to the buoyancy of the individual fruits and help materially to keep them afloat and moving. These sprays and the natural flow of the liquid in the tank from the forward to the rear cause the floating fruits to crowd against the gate 3 with an effort to pass through and is the movement that causes them to flow into the tray compartments as the gates open.

In order to maintain a complete circulation of the liquid in the tank a circulating pump 11 is provided which carries the liquid in the direction of the arrows with a force consistent with the speed of the pump. Liquid for the sprays 10 is obtained from the tank at 12 and is circulated by the small spray pump 13, this small pump also supplying the member 4 with liquid for its sprays. Suitable valves are arranged to control the flow of liquid as may be desired.

In Fig. 2 I have indicated hooks and portions of a lifting tackle by means of which the containers may be removed from the tank when filled and empty containers placed therein. I have not shown any power means for raising the gates 3 and 8. This may comprise any suitable type of hoisting apparatus equipped with reverse movement so they will be moved in either direction. In this figure I have roughly indicated articles that may be pineapples or any other fruit or articles that is adapted to handling in the manner described. The operation of my improved method would be somewhat as follows:

Assuming that we are dealing with pineapples, the fruit is deposited en masse in the forward end of the tank at "A". The tank being first filled with a suitable fluid, for purpose of illustration we will consider it to be water. The rapid circulation of the fluid in the direction of the arrows through the action of the pump 11 and the sprays 10 will cause the semi-buoyant fruit to be held in mobile suspension in the water and tend to follow its direction of flow with the result that it will crowd against the outer surface of gate 3 and be held thereby from further movement.

As soon as the gates are raised and the lowermost opening into the container trays is uncovered the apples will begin to move into the tray and become firmly compacted therein as is indicated in Figure 2. This action continues as fast as the tray openings are uncovered. The flow of the water will be much more rapid than the movement of the fruit so that the fruit will receive a constant urging to move onward and will as a consequence soon fill the tray compartments. As soon as the trays are full the gates will be lowered, when the powerful spray from the under side of the spray member 4 will force the freely floating apples away from the openings into the trays and thus prepare a free path for the closing gates and prevent crushing or damaging any of the fruit. This filled container will now be removed by means of a suitable hoisting apparatus and disposed of in any manner provided for and an empty container placed in the tank when the operation will be repeated.

Besides affording a very economical and efficient manner of handling pineapples by my method it also serves as a very efficient washing and cleaning device, all of the dirt and sediment adhering to the fruit being deposited in the bottom of the tank from which it will be removed at frequent intervals.

I have not illustrated the tank used at the discharge end of the system, where the pineapples are floated out of the containers in the same manner that they were floated into the containers. This discharge tank does not necessarily need a barrier gate, the gate in the container serving alone to release the apples from the tray compartments. The containers would be placed into guides the same as is illustrated in the tank shown, the container gate elevated gradually and the rapidly flow of liquid would sweep the apples out of the tray compartments into the free flowing water of the tank where they would be kept in agitation and movement in the same manner as in the loading tank. The various sprays tending to gradually move them along the line of flow of the liquid. The discharge end of the unloading tank would terminate in a water runway which would serve as a means of conveyance to carry the fruit to any point of distribution about the factory. The pineapples by this method of handling are continuously cushioned against shock or bruise from the time they are placed into the loading tank until they are finally disposed of in the cannery or packing house. The liquid used in the tanks may carry sterilizing properties whereby the surfaces of the fruit are rendered sterile and free from contaminating substances that may have gathered thereon during a season in the open air.

What I claim as new and desire to secure by Letters Patent is:

1. The method of segregating articles for transport to a point of distribution comprising the steps of promiscuously placing articles in bulk into a fluid, circulating said fluid in a manner to hold said articles in mobile suspension, progressively admitting said articles into a series of compartments immersed in said circulating fluid, removing said compartmented articles from said fluid, transporting them to another body of circulating fluid whereby they are removed from said compartments by said fluid.

2. The method of segregating articles for transport to a point of distribution comprising the steps of promiscuously placing articles into a circulating fluid whereby said articles are held in mobile suspension, admitting said articles to a container immersed in said fluid, enclosing said articles in said container, removing said container from said fluid, transporting said container to another body of fluid, opening the container and circulating said fluid whereby said articles are removed from said container and are caused to be conveyed by said fluid to points of distribution.

3. A method of handling and transporting pineapples comprising the steps of placing pineapples in promiscuous arrangement into a tank containing a fluid, circulating said fluid to hold said pineapples in mobile suspension and move them in the direction of flow of said fluid, immersing a compartmented container in said fluid, permitting the suspended pineapples to float into the compartments of said container, removing said container from said fluid, transporting said container to another body of fluid, circulating said fluid to cause said pineapples to float out of the compartments of said container and moving said pineapples by means of circulating fluid to ultimate points of distribution.

4. A method of handling and transporting pineapples comprising the placing of pineapples into a fluid medium, agitating said fluid medium whereby said pineapples are moved about by said medium and are cleansed thereby, placing a compartmented container in said fluid medium whereby said pineapples are intercepted and collected in said container, removing said container and transporting it to another body of fluid, circulating said fluid whereby said pineapples are removed from said container and carried by said fluid to ultimate points of distribution.

5. A method of handling pineapples consisting of placing freshly gathered pineapples in a fluid medium, circulating said fluid medium to move said pineapples, placing a perforated container in the path of said circulating medium and said moving pineapples whereby said pineapples are trapped in said perforate container while said fluid medium passes therethrough, removing said perforate container from said fluid medium, transporting it to another body of fluid medium, circulating said fluid medium whereby said pineapples are caused to move out of said container through the flow action of said fluid medium and conveying said pineapples to ultimate points of distribution by a continued flow of said fluid medium.

6. A method of handling, cleansing and sterilizing fruits consisting in placing whole fruits promiscuously into a body of fluid having cleansing and sterilizing properties, agitating said fluid whereby said fruit is wholly immersed and moved about therein, placing a portable container in said fluid whereby as said fruit is moved by said fluid it is directed into said container, transporting said container to another body of fluid, circulating said fluid whereby said fruit is removed from said container and moved by said fluid to points of ultimate distribution.

7. A method of handling and transporting fruits consisting in providing a compartment containing a body of circulating fluid medium, placing a perforated barrier in said compartment, immersed in said fluid medium, placing fruit promiscuously into said fluid medium on one side only of said barrier, placing a perforated container on the other side of said barrier in said fluid medium, circulating said fluid medium to carry said fruit toward said barrier, gradually removing said barrier so the circulating medium will carry a portion of said fruit into said container, replacing said barrier to divide and separate the remaining fruit in said fluid from said container, removing said container with the enclosed fruit and transporting it to a point of distribution.

In testimony whereof I have signed my name to this specification.

FRANCIS BETTS SMITH.